Sept. 30, 1941.   L. T. TAYLOR   2,257,248
TOOL HEAD
Filed Sept. 13, 1939
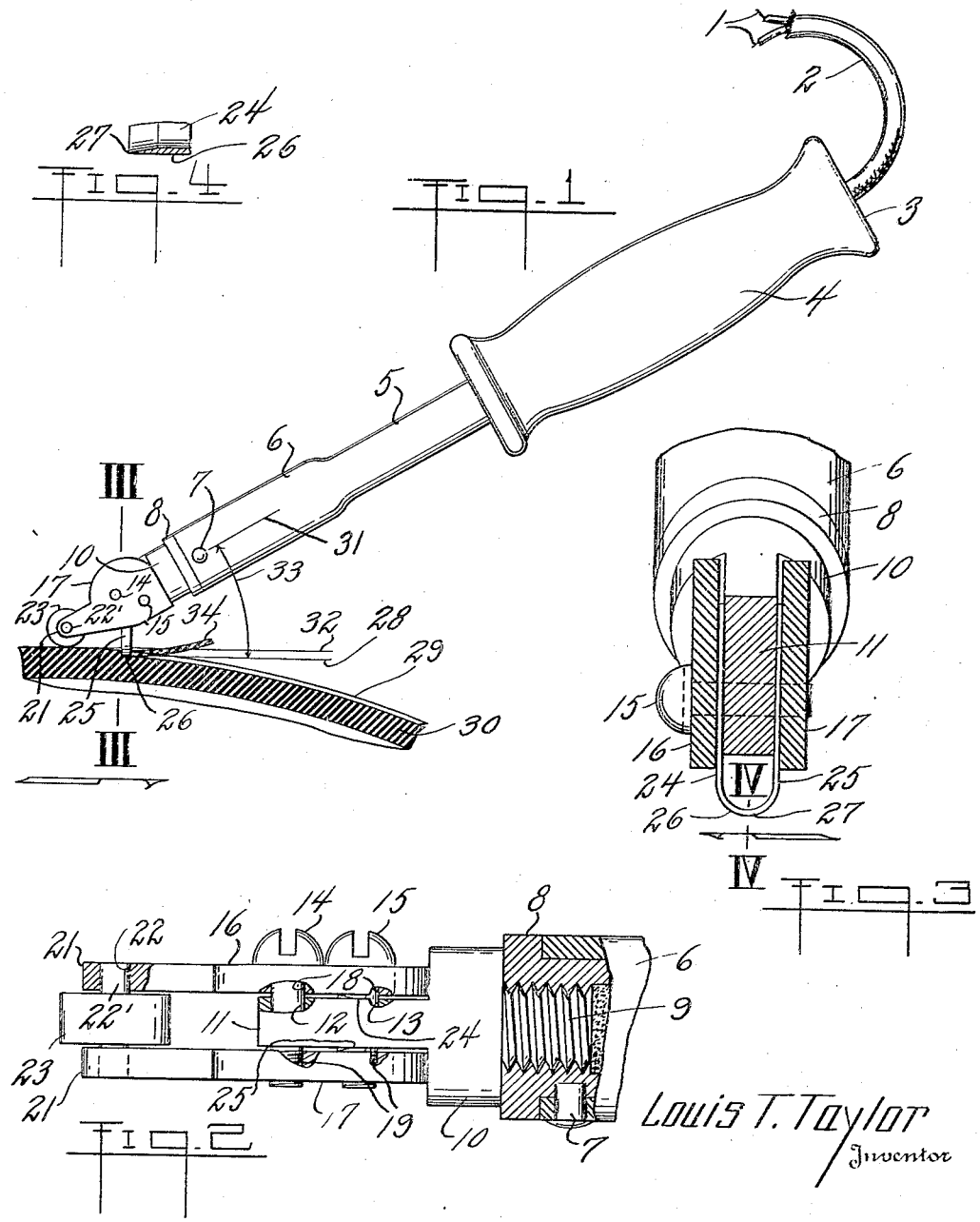
Louis T. Taylor
Inventor Patented Sept. 30, 1941

2,257,248

UNITED STATES PATENT OFFICE 2,257,248

TOOL HEAD

Louis T. Taylor, Maumee, Ohio

Application September 13, 1939, Serial No. 294,674

3 Claims. (Cl. 30—140)

This invention relates to an adaptable hand-operable cutting tool.

This invention has utility when incorporated in heads for handles, such as of the electric heated soldering iron type, for locating and directing a blade to cut ways or grooves in the casing or tread rubber portion, whether new or used, to develop or restore non-skid characteristics to the tires of motor vehicles.

Referring to the drawing:

Fig. 1 is a side elevation of an embodiment of the invention as a tire tread regrooving head for a hand operable tool;

Fig. 2 is a plan view of the head of Fig. 1, with parts of the mounting therefor broken away;

Fig. 3 is a section on the line III—III, Fig. 1, showing the blade mounting; and Fig. 4 is a section on the line IV—IV, Fig. 3, showing the cross-section configuration of the blade.

The conductor lines 1, extend into a conduit 2, which enters an end 3 of a handle 4. This handle or grip portion 4, has, remote from the end 3, a tubular extension comprising sections 5, 6, as housing for an electric heater, more particularly as adapted to the soldering iron type of hand tools. The section 6 has anchored therein by means of pins 7, an internally threaded bushing 8.

The head proper hereof has an externally threaded portion 9 from a collar 10. Oppositely from the portion 9, the collar 10 has a tongue member 11. Holes 12, 13, through the tongue 11, have screws 14, 15, therethrough respectively, for assembling cheeks 16, 17, upon opposite sides of the tongue 11. The screws 14, 15, are loose in holes 18 in the cheek 16, but have threaded engagement in holes in the cheek 17. Beyond the tongue 11, the cheeks 16, 17, have termini 21 with holes 22 in alignment to receive a pin or axle 22' for mounting anti-friction bearing member or roller 23 to turn on the axle as a pivot therefor.

This assembly for the head is herein specially adaptable for ranges of utility. For instance, a pair of parallel legs 24, 25, from an intermediate bend 26, form a U-shaped knife having a beveled cutting edge 27. The spacing between the openings 12, 13, in the tongue 11, may be somewhat greater than the width of the U-knife back from the edge 27. Accordingly the projection for the return bend portion of the blade may be at a range depending upon how far the legs 24, 25, extend along the tongue 11, to be there clamped by the screws 14, 15. Besides this range of projection, there may be a range of direction or swing to a fixed or locked position with the handle.

A line of direction 28 for the blade is efficiently effective for uniformity in depth of cutting a groove 29 in a tire 30, when a line of direction 31 for the handle is such that a line 32 determined by the surface of the tire 30 is tangent to the roller 23. At such stable direction for operation in an arc 33, there is a smoothness of functioning for removal of a rubber strip 34 from a motor vehicle tire casing, with the lines 28, 32, parallel.

The head is detachable. When used with an electrically heated device, such heat to the blade may be a contributing factor to its ease of cutting operation, as well as cleanness of the cutting. Ready avoidance of smearing, or too great a temperature at the anti-friction bearing 23 may be achieved by having such roller not of steel or bronze, but of fibre.

From the foregoing, it is seen that the substitution of a different diameter roller 23, may be adopted to change the depth of cut desired. Without otherwise adjusting the blade, then a smaller diameter for the roller 23 would be a factor toward a greater depth of cutting. Notwithstanding that the roller is some distance in advance of the knife, it seems to have a firming effect on the rubber to be cut out from its path. The rolling contact seems to reduce the resistance to progress, as additional factors in promoting ease for operation.

What is claimed and it is desired to secure by Letters Patent is:

1. A tire groover comprising a handle, a cutting head projecting from the handle and having vertical slot-providing means and horizontal passages, a U-shaped cutter having the legs thereof received by the slots, threaded means, and a wheel, there being parallel extension means from the head adapted to be engaged by said threaded means coacting to clamp the legs of the U-shaped cutter in the slots and position the wheel in advance of the thrust tool for supporting the head above the surface of the tire to be grooved by the cutter.

2. A tire grooving tool embodying a handle, a head mounted by and projecting from the handle, said head including a tongue, a pair of cheeks, and means anchoring the cheeks to be spaced by the tongue and providing parallel extensions therebeyond, a roller between the extensions and mounted thereby, and a cutter adjustably engaged between the tongue and cheeks, said cutter having a connecting loop located in the path of the roller in the thrusting of the tool, said cutter having a blade at the loop beyond tangent from the roller toward the cutter.

3. A tire grooving tool embodying a handle, a head mounted by and projecting from the handle, said head including a tongue, a pair of cheeks, and means anchoring the cheeks to be spaced by the tongue and providing parallel extensions therebeyond, a roller between the extensions and mounted thereby, and a U-shaped cutter having its legs adjustably engaged between the tongue and cheeks, the return bend of said U-shaped cutter being located in the path of the roller in the thrusting of the tool, said cutter having a blade at the return bend beyond tangent from the roller toward the cutter.

LOUIS T. TAYLOR.